L. H. SERRY.
GREASING VENT.
APPLICATION FILED DEC. 3, 1914.

1,148,545.

Patented Aug. 1915.
2 SHEETS—SHEET 1.

WITNESSES:
Wm A Fry
S. Vernon St. John

INVENTOR
Lawrence H. Serry

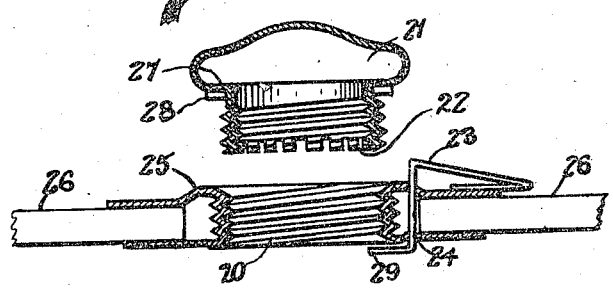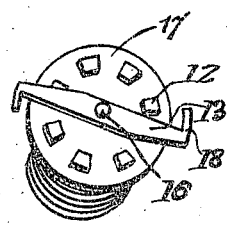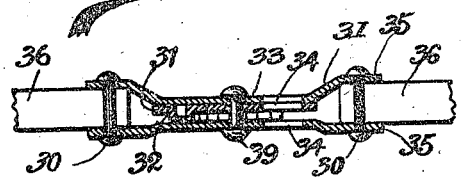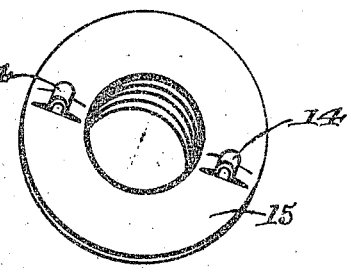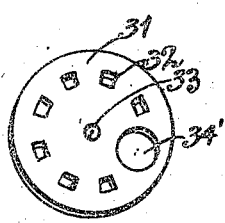

UNITED STATES PATENT OFFICE.

LAWRENCE HENRY SERRY, OF CANON CITY, COLORADO.

GREASING-VENT.

1,148,545.
Specification of Letters Patent.
Patented Aug. 3, 1915.

Application filed December 3, 1914. Serial No. 875,254.

*To all whom it may concern:*

Be it known that I, LAWRENCE HENRY SERRY, a citizen of the United States, and a resident of Canon City, in the county of Fremont, and in the State of Colorado, have invented a new, useful, and Improved Greasing-Vent, of which the following is a specification.

My present invention relates generally to a means of lubricating moving parts incased within pliable grease retainers, and more particularly to a closable vent for greasing universal and ball joints incased within flexible boots, such as are frequently used on motor vehicles; my primary object being to provide an opening for introducing a lubricant through the walls of the boot to its interior and a cap for suitably closing the same.

Another object is to permit the grease being introduced without loosening the incasing boot.

Another object is to allow the boot to remain stretched in its normal shape whereby it may be the better filled to capacity.

Another object is to provide a movable cover for the vent or aperture to facilitate the introduction of the lubricant, to properly retain same when closed and to exclude dust and other foreign matter.

Another object is to provide a direct means of applying the lubricant directly upon the moving parts within, avoiding waste and ineffective lubrication.

Another object is to provide a means of holding the cover of the aperture secured thereto enabling it to successfully withstand rapid movement and vibration.

Another object is to support the grease vent wholly by and upon the flexible casing so as to free the former from undue vibrations.

Still another object is to provide a means of securely holding the leather of the boot fast to the aperture's exterior so as to reinforce the edges of the hole pierced in the leather.

A further object is to provide a fastening suitable to hold the aperture tightly to the leather boot without cutting or chafing the latter.

A still further object is to relieve the flexible boot of undue strain by providing an exceedingly light aperture and cover.

With the foregoing and other objects in view which, with their resulting advantages, will appear as the description proceeds, the invention resides principally in the combination, relation and arrangement of parts and in the detailed construction of the embodiments herein disclosed in the accompanying drawings which form a part of this specification, in which—

Figure 1:
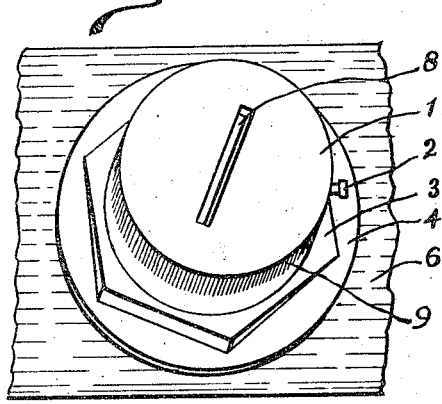
Figure 2:
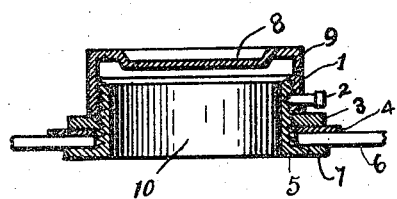
Figure 3:
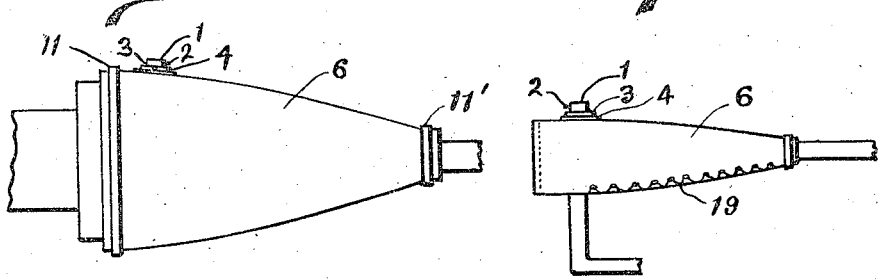
Figure 4:
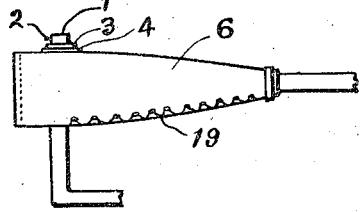

Figure 1. is a perspective view of one embodiment of the invention, showing a portion of the leather of the grease boot. Fig. 2. is a cross section of the embodiment illustrated in Fig. 1. Fig. 3. is a view in elevation showing the application of the invention to a grease boot incasing a universal joint. Fig. 4. is the same as Fig. 3, with the exception that the boot illustrated in this figure is adapted to inclose a ball joint. Fig. 5. is a cross section of another embodiment of the invention showing the cap removed from the base. Fig. 6 is a perspective view of the cap and base of an embodiment varying slightly from that illustrated in Fig. 5. Fig. 7 is a cross-section and top view of still another embodiment of the invention herein disclosed. Fig. 8 illustrates the top view of the rotary disk or cap designated by the numeral 31 in Fig. 7, where it is shown in cross-section.

The same embodiment is illustrated in both Fig. 1 and Fig. 2, and like parts are designated by the same numerals in both figures, however the cylindrical opening 10 forming the aperture through which grease is introduced, and the externally threaded collar 5 bounding said aperture and having at one end a flange 7 appear only in the cross sectional view Fig. 2. This externally threaded collar 5 is thrust outwardly to the shoulder of the flange 7 through a close fitting perforation in the leather wall of the grease boot 6; a metallic gasket 4 is placed over the threaded end of the collar 5 and held firmly against the leather 6 by means of a cinch nut 3 engaging the external threads of the collar 5 thus affording a grease tight connection, reinforcing the edge of the perforation and forming a metallic rimmed aperture 10 through which a lubricant may be introduced to the interior of the boot. A cylindrical cap 1 is fitted with internal threads to engage the external threads of the collar 5 above the cinch nut 3 forming a grease tight cover for the above mentioned aperture 10. The cap 1 is provided with a set screw 2 for locking same in place and also with a groove 8 and a knurled edge 9 to facilitate turning the said cap.

In Fig. 3 a grease boot of the usual type is shown, bound in place by the customary metallic bands 11' and 11; the grease vent may be located at any suitable place on the leather casing 6 by making the necessary perforation and inserting the parts as described above. This figure illustrates the grease vent in place upon the boot 6 near its larger end, the cap 1, the set screw 2, the cinch nut 3 and the metallic gasket 4 only appearing; however on a revolving boot it would be preferable to locate the grease vent near the smaller end for several obvious reasons.

In Fig. 4 the cap 1, set screw 2, cinch nut 3, and gasket 4 appear showing the preferable location of the grease vent upon the ordinary boot incasing a ball joint, the same being held in place by the lacing 19; the ball joint should be made with a small oil hole facing the grease vent to insure proper lubrication.

A modified form of the invention is illustrated in Fig. 5, showing the cap removed from the base. In this form the cap 21 is externally threaded and provided with a number of small projections 22 about the periphery at the threaded end; the head of the cap being greater in diameter than the threaded end affords a shoulder 27 for the retention of a gasket 28. The base 25 is internally threaded and is diaform in construction, being pressed to final shape after being inserted into the perforation in the leather 26. A spring wire 23 is rigidly fixed to the outside of the base and after a suitable curve to give it elasticity is bent at right angles near the aperture 20 and extends through a small hole 24 to the inside of the base 25 where it is again bent at right angles so as to terminate with an end 29 projecting into the aperture 20 in such a manner as to engage the projections 22 of cap 21 when the latter is screwed into place. By a downward pressure upon the wire 23 the projecting end 29 is caused to disengage itself from the above mentioned projections 22 of the cap 21 allowing the latter to be turned freely; by releasing the pressure upon wire 23 when the cap 21 is in place the projecting end 29 rises again between two of the projections 22 securely locking the cap 21 to the base 25 and insuring the effective sealing of aperture 20.

In Fig. 6 the grease vent is shown apart from the leather casing the construction varying slightly from that shown in Fig. 5 in that a different method is employed to lock the cap 17, it being provided with a crossbar 13 terminating at either end in a right angled hook 18, this spring cross bar 13 is pivoted centrally upon a rivet 16 but is prevented from turning freely by a series of bosses 12 diametrically arranged about the center upon the face of the cap 17. The diaform base 15 is provided with two loops 14 in positions diametrically opposed at such distance as to receive the right angled hooks 18 of the cross bar 13 when the cap 17 is screwed home into the base 15. After the hooks 18 are inserted into the loops 14 the cap is securely locked for the reason that the bosses 12 prevent the cap from turning without the cross bar. The cap can be again unlocked by prying up the crossbar 13 and turning it backward until free from the loops then forward over them when unscrewing the cap; this construction also affords an efficient locking device.

Fig. 7 shows a cross-section and top view of a different embodiment of the invention, in which the cap 31 is not removable but revolves upon a central rivet 39 between two circular concave disks 35 which form the base. This revolving cap 31 is more clearly shown in a top view Fig. 8, it is provided with a central perforation 33 for the rivet 39, Fig. 7, and a second perforation 34' located between the center and the circumference and with a series of indentations 32 arranged in a line also between the center and the circumference. These indentations serve a triple purpose, they hold the revolving cap 31 pressed tightly against the outer disk 35, they produce friction sufficient to hold the cap set where placed, and facilitate the turning of the cap with any pointed instrument. The circular dished disks 35 are similar to each other in shape and size and are provided with one central perforation 33 for the rivet 39 a second elongated perforation 34 corresponding in distance from the center with that of perforation 34' in the revolving cap 31 as illustrated in Fig. 8, and a series of perforations are provided near the circumference for the rivets 30 which hold the two disks securely in place one on either side of the leather 36 and over the hole therein, and with elongated perforations 34 superimposed one directly over the other. These two disks 35 are slightly dished at circular region marked 41 so as to fit snugly against revolving cap 31 which is centrally riveted between them, but of less thickness than the surrounding leather 36 which is also riveted tightly between them at their circumferences. Since the elongated perforations 34 are superimposed and the same distance from the center as perforation 34' in cap 31, by revolving the latter these three perforations 34 and 34' may be made to exactly coincide affording an opening for the introduction of a lubricant; by using a pointed instrument in the indentations 32 of the cap 31 the latter may be revolved upon rivet 39 bringing the perforation 34' in opposition to the perforations 34 and closing the hole, thus making a grease tight stopper.

Having thus fully described several embodiments of my invention, I claim:—

1. The combination of a grease boot having a greasing aperture comprising a perforation in the grease boot rigidly bound by an annulus engaging both sides of the bordering walls to fasten said annulus in place and out of direct contact with incased machinery, with a stopper for the aperture of the annulus and means to secure said stopper.

2. The combination of a flexible grease boot incasing moving parts said grease boot having a lubricant receiving hole pierced in the flexible wall thereof, with a rim of rigid material bounding said hole, and a movable lid fitted to above mentioned rim to close the hole and a device to secure the latter.

3. The combination of a grease boot having a bound aperture in its wall, insulated from mechanical vibrations by the intervening flexible parts of said boot, a stopper therefor, and a fastener to secure the latter.

LAWRENCE HENRY SERRY.

Witnesses:
E. M. COLLINS,
G. V. HODGIN.